J. J. GREENOUGH.
Making Glass.
No. 9,791.
2 Sheets—Sheet 1.
Patented June 14, 1853.
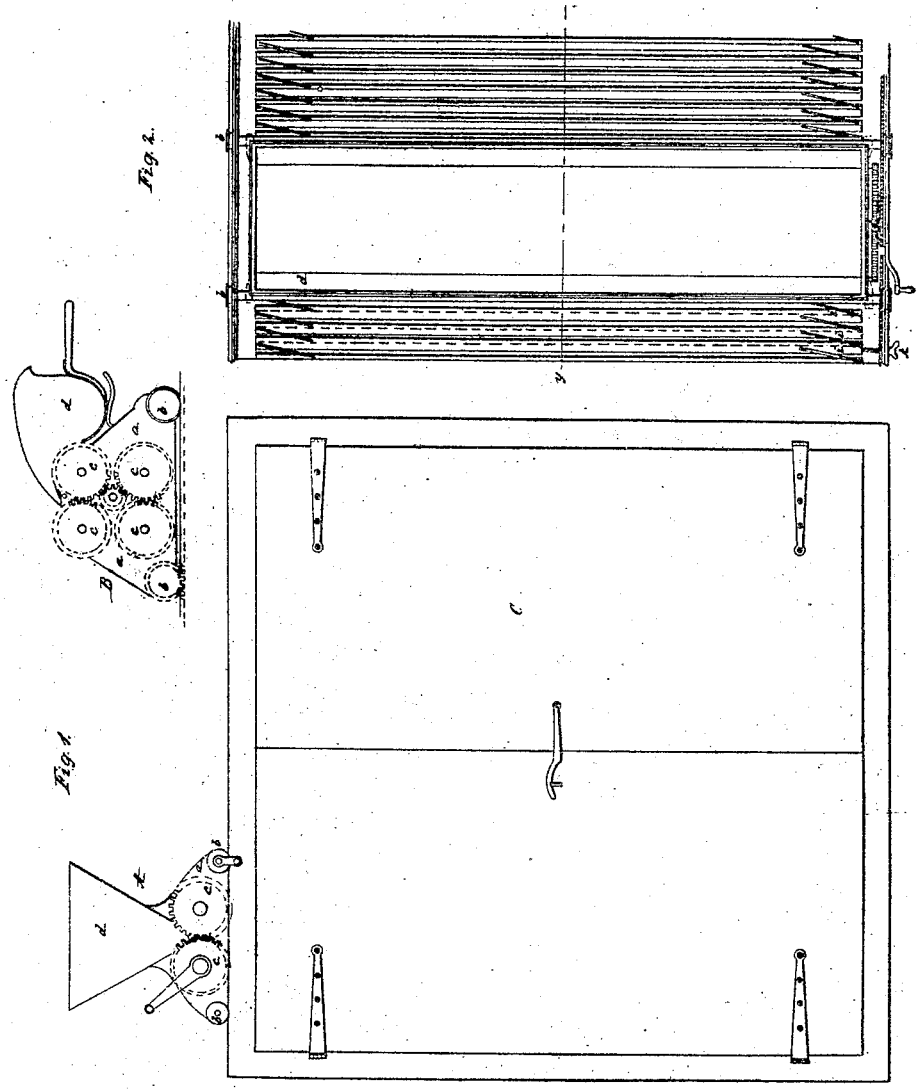

J. J. GREENOUGH.
Making Glass.
No. 9,791.
2 Sheets—Sheet 2.
Patented June 14, 1853.
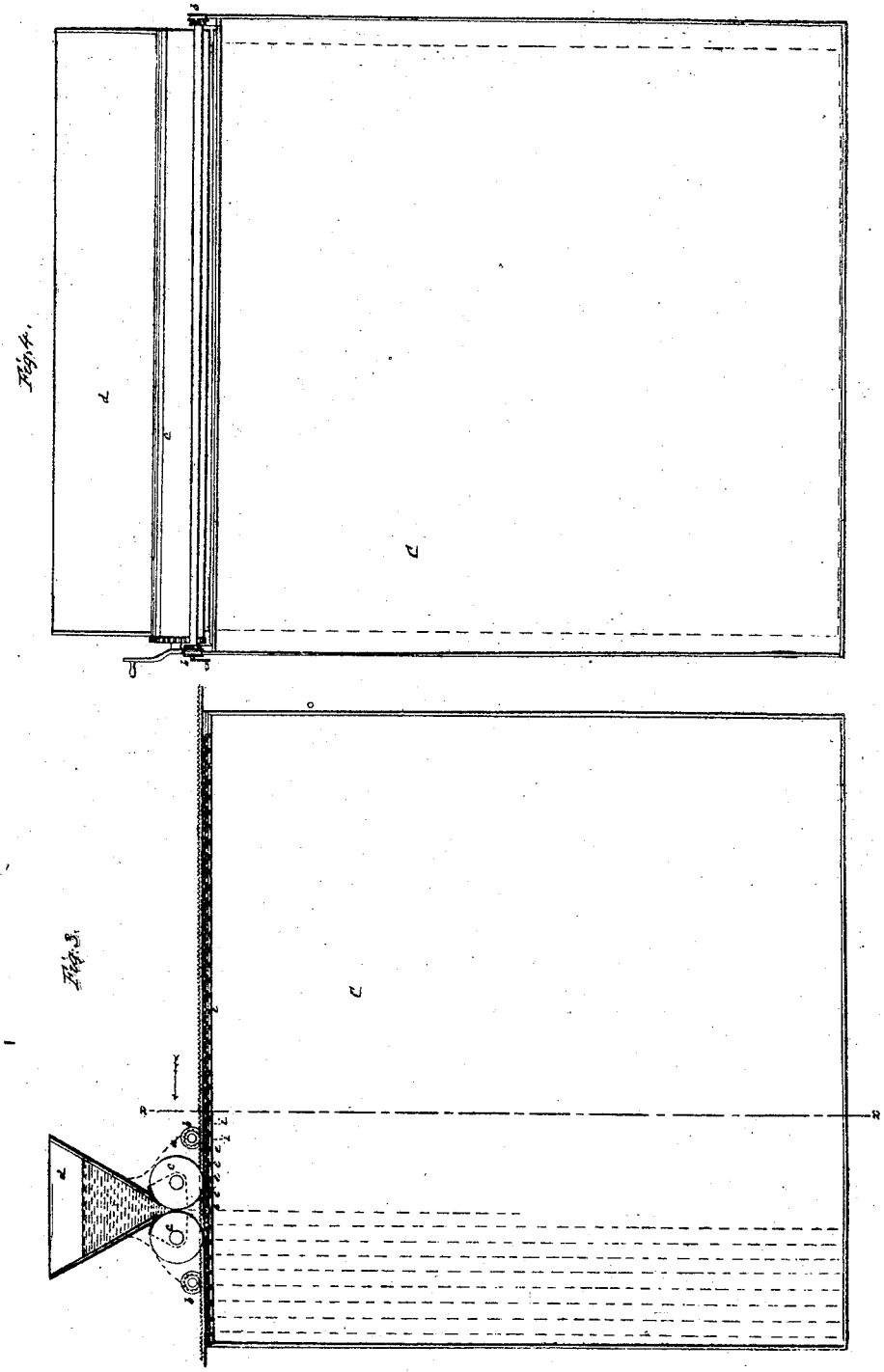

UNITED STATES PATENT OFFICE.

JNO. J. GREENOUGH, OF BOSTON, MASSACHUSETTS.

MANUFACTURE OF PLATE-GLASS.

Specification of Letters Patent No. 9,791, dated June 14, 1853.

*To all whom it may concern:*

Be it known that I, JOHN JAMES GREENOUGH, late of Boston, in the county of Suffolk and State of Massachusetts, have invented certain new and useful Improvements in Manufacturing Plate-Glass, and that the following is a full, clear, and exact description of the principle or character which distinguishes them from all other things before known and of the usual manner of making, modifying, and using the same, reference being had to the accompanying drawings, in which—

Figure 1, is an elevation; Fig. 2, is a plan of apparatus; Fig. 3, is a cross section on line *y*, *y*, Fig. 2; Fig. 4, is a vertical section on line *x*, *x*, Fig. 3.

The same letters refer to like parts on all the figures.

My improvements consist in the apparatus and process of forming plates of glass, by causing the melted material to pass between two or more pairs of rollers, while in a plastic state, and in keeping said plates between the rollers, and supported by them till cool enough to support themselves straight without stretching while annealing, by suspending them by thir upper edges in an annealing chamber, during the process of cooling. Both of these processes may be used, in conjunction, which I consider the most perfect mode of manufacture; or either can be employed where the old modes are in part resorted to.

My new apparatus consists in a carriage composed of two side pieces (*a*) properly connected, and placed on truck (*b*) on which it moves. This carriage supports two or more pairs of rollers (*c*). In Fig. 1, B, the lower ones may be placed nearer than those above them, so as gradually to reduce the thickness of the glass as it passes between them.

A hopper, or reservoir (*d*), containing the melted glass from the furnace, is located above the upper rollers, so that by opening its bottom the glass can be precipitated directly between them, as in Fig. 1, A, as it is hung in a frame, so that it can be turned up, and pour the glass on to the rollers, which, by their revolution cause it to pass down between, as in Fig. 1, B. In case two or more pairs of rollers are used, the second pair move faster at their surface than the first pair, and the glass is drawn to any thickness. It is necessary for the glass to be cool enough to sustain itself before it enters the annealing chamber, if my second improvement is used. If the rollers are found to become too highly heated they can be cooled to any degree by a current of steam or water introduced into their interior through their journals, as is done in paper drying machines, and many others. One or more of the rollers can be embossed in any desired pattern, which will be transferred to the glass, either for ornament or strength, or the cylinders may all be perfectly plain, making smooth surfaces.

This second part of my improvement consists in the annealing chamber (C,) which is rectangular, and may be of any dimensions; in the top of this chamber are a series of long narrow fissures (*e*,) extending the whole breadth of the chamber, which is equal to the length of the rollers. Each of these openings is furnished with a clamp (*i*), which may be formed like a parallel ruler, as shown in the drawing, or in any other way found most convenient; it may be set up by a screw (*k*) at the end, or other well known device, so as to grip the glass it is to sustain.

The annealing chamber is heated by air pipes connected with the furnace, by which a proper supply of heat is kept up in the annealing chamber.

To enable persons skilled in the art of manufacturing plate glass to use my improvement, I will describe the process of manufacture thereby.

The glass is made and prepared in the usual way, and then transferred to the hopper, or reservoir, which is placed in a heating arch, where it is brought to the necessary temperature; when the glass is in a proper state, the hopper is removed, and by means of cranes, or other devices, it is transferred to the carriage, which runs along a railway over the annealing chamber, with its rollers parallel with the fissures therein; when directly over one of these openings, the metal is caused to run between the rollers, as before named, and thence down into the annealing chamber; when a sufficient length has been run off into the chamber, the clamp is closed upon it, and the glass is broken off above, the carriage then passes on to the next opening, and the same process is repeated.

It is obvious the carriage may be stationary and the clamps move along in the annealing chamber. The glass thus suspended maintains a perfectly straight position till annealed, and much labor is saved in the after process of grinding and polishing. Both sides can, if desired, be embossed, and not be injured, as would be the case if they were made to lie upon a bed or table. It is obvious that the rollers alone can be used without the annealing by suspension, either by passing the carriage in which they are situated over a bed or table, on to which the glass is delivered, or else causing the table to pass under the rollers as fast as the plate of glass is delivered from them, which may then be annealed in the ordinary way; or the glass manufactured by any known process can be suspended in the annealing furnace, to be kept straight while cooling.

Having thus fully described my improved process of making plate glass, and annealing the same, what I claim as my invention, and for which I desire to secure Letters Patent, is—

1. Manufacturing plates of glass by causing the glass, while in a plastic state, to pass between two or more pairs of rollers, substantially in the manner and for the purpose set forth.

2. I also claim embossing the surfaces of plate glass, by passing it between embossing rollers, as above described.

3. And lastly, I claim suspending plates of glass by their upper edges, after they have been formed, while annealing, so as to keep them in a perfect plane, without resting on a bed.

JOHN JAMES GREENOUGH.

Witnesses:
L. WILLIAMS,
H. B. MORSELL.